March 11, 1958  J. N. CHILDS, JR  2,826,378
APPARATUS FOR RADIO CONTROL OF GUIDED MISSILES
Filed Dec. 15, 1950  4 Sheets-Sheet 1

INVENTOR
JOHN NORRIS CHILDS JR.
BY K. Donaldson
ATTORNEY

March 11, 1958     J. N. CHILDS, JR     2,826,378
APPARATUS FOR RADIO CONTROL OF GUIDED MISSILES
Filed Dec. 15, 1950     4 Sheets-Sheet 4

INVENTOR
JOHN NORRIS CHILDS JR
BY K. Donaldson
ATTORNEY

United States Patent Office 2,826,378
Patented Mar. 11, 1958

2,826,378

APPARATUS FOR RADIO CONTROL OF GUIDED MISSILES

John Norris Childs, Jr., Wyndmoor, Pa.

Application December 15, 1950, Serial No. 201,016

15 Claims. (Cl. 244—14)

This invention relates to control apparatus and more particularly to radio control apparatus for guided missiles. The present application is a continuation in part of my copending application Serial No. 669,769 filed May 15, 1946 for Apparatus for Control of Guided Missiles, now abandoned.

Heretofore the various systems for controlling guided missiles have had one or more of the following disadvantages: (a) they are extremely complex, (b) they are excessively heavy and cumbersome for convenient installation in a guided missile, (c) they are vulnerable to enemy jamming, (d) they permit only one missile to be controlled by one mother station at one time, and (e) their manufacture requires new manufacturing facilities and techniques.

It is an object of this invention to provide simple apparatus for radio control of guided missiles.

Another object of this invention is to provide such apparatus which is lightweight and convenient for installation in guided missiles.

Still another object of this invention is to provide such apparatus which will be invulnerable to enemy jamming.

A further object of this invention is to provide such apparatus which will make possible the control of more than one guided missile by one mother station at one time.

These and other objects will become apparent upon a consideration of the following description in conjunction with the accompanying drawings in which.

The mother equipment required for this method of guided missile control is simply a directional transmitter adapted to provide a very narrow rapidly sweeping radio beam. The transmitting antenna is pointed so that the center line of the swept sector intersects the target. Each time the beam sweeps past the missile a signal is received thereat. If the time intervals between successive signals at the missile are equal, the missile is traveling down the center line of the swept sector and directly toward the target. If, however, the time intervals are unequal, the missile is displaced from the center line. Therefore, by differentiating between signals received at the missile on right and left sweeps, the amount and direction of the deviation from the center line may be determined. This error information can be used to adjust the control surfaces of the missile to direct it on to the correct course.

Figure 1:
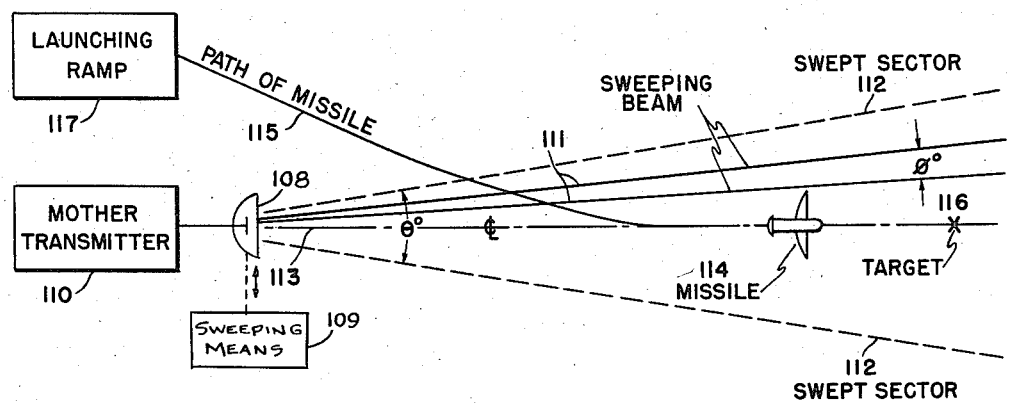
Fig. 1 is a view showing one use of an embodiment of this invention.

Fig. 1 discloses apparatus for guided missile control. The mother transmitter 110 is a high frequency pulsed oscillator which feeds a directional antenna 108 adapted to provide a narrow beam of energy 111 of $\varphi$ degrees sweeping through a sector 112 of $\theta$ degrees with a simple harmonic motion about the center line 113 of the sector 112. The mechanism for producing the sweeping of the beam can be of conventional design and is generally represented by rectangular box 109. The missile 114 is launched in the general direction 115 of the target 116 from launching ramp 117, the only requirement being that the path of the missile intercept the swept sector 112. Once in the swept sector 112, the missile 114 is directed on to and maintains a course along the center line 113 and proceeds at constant height to the target 116 where it is detonated by contact, proximity fuse, or remote control. A constant height to cause missile 114 to strike target 116 is maintained by any of a number of well known radio altimeter-automatic pilot equipments. In a typical example the mother transmitter 110 comprises a pulsed microwave oscillator with a pulse repetition frequency of 1500 pulses per second, and a directional antenna providing a narrow beam 111, one degree in width, sweeping through a sector 112 of eleven degrees with a simple harmonic motion of five cycles per second about the center line 113 of the sector 112.

Figure 2:
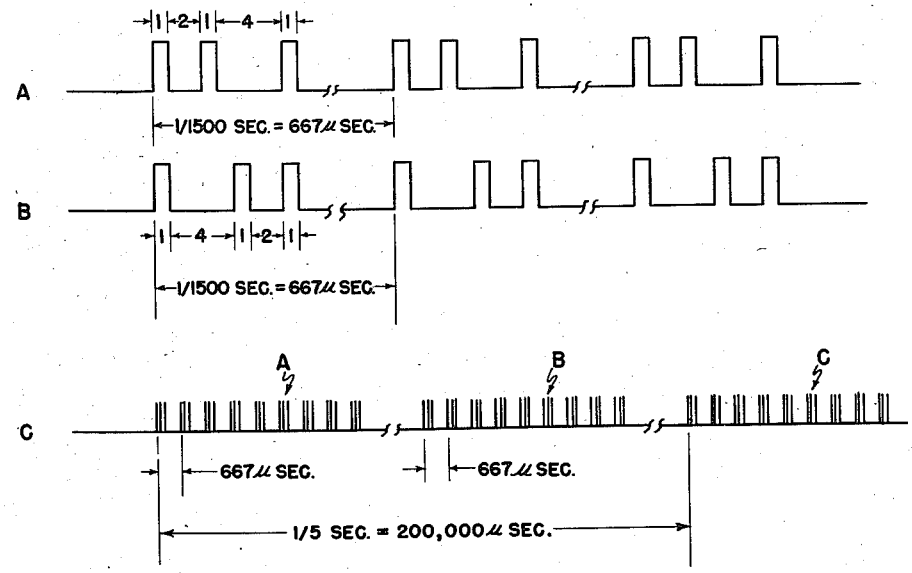
Fig. 2 is a group of waveforms of modulation envelopes used with the embodiment of Fig. 1.

To facilitate differentiation between right and left sweeps, it is necessary to change the characteristics of the transmission between sweeps. This may be accomplished in several ways, for example, by causing the pulsed microwave oscillator to operate at one carrier frequency during the right sweeps and at a slightly different carrier frequency during the left sweeps. The signals received by the missile during the right and left sweeps, respectively, may be separated by suitable filters operating either at the microwave frequency or at some lower frequency obtained by beating the received signals against a locally generated signal in a conventional first detector circuit. A second method of differentiating between right and left sweeps is to impress a pulse code on each transmission of the pulsed microwave oscillator, the pulse code having a different characteristic during the right and left sweeps, respectively. Fig. 2 discloses typical waveforms of modulation envelopes which are used in the second example described above. The oscillator in mother transmitter 110 is modulated with sets of three one-microsecond pulses, each set of three occurring at the pulse repetition frequency of 1500 times a second. The three one-microsecond pulses of each set are spaced differently for the right and left sweeps. The modulation envelope on the right sweep is that of Fig. 2A while that on the left sweep is that of Fig 2B.

Figures 5, 6:
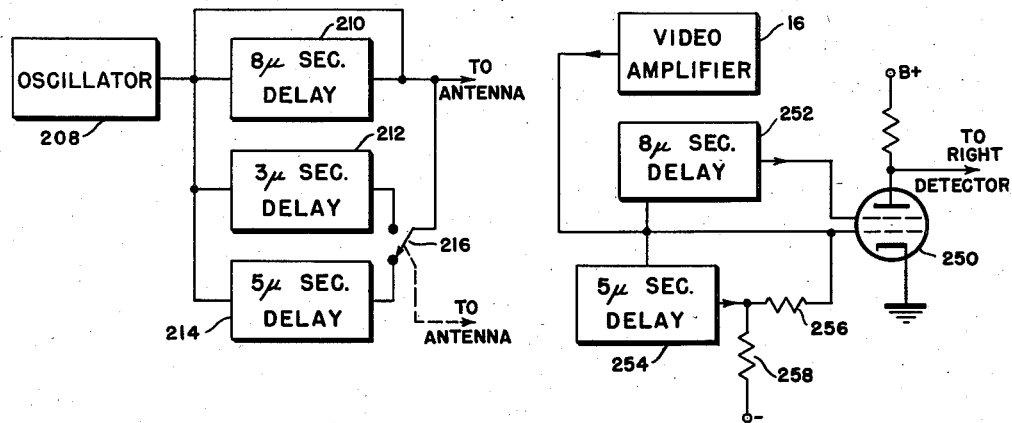
Fig. 5 is one form of pulse coder that may be employed in the mother transmitter.
Fig. 6 illustrates one form of decoder circuit that may be employed in the embodiment of Fig. 3.

Fig. 5 illustrates in block form a typical circuit for impressing the desired pulse code on the output of mother transmitter 110. The output of the transmitting oscillator 208 in mother transmitter 110 may be connected directly to the transmitting antenna (not shown) and to the inputs of three delay lines, 210, 212 and 214 respectively. Delay lines 210, 212 and 214 have delay times of 8 microseconds, 3 microseconds and 5 microseconds respectively. The ouput of delay line 210 is connected directly to the transmitting antenna while the outputs of delay lines 212 and 214 are connected to this antenna through two-position switch 216. Switch 216 is mechanically coupled to the antenna so that it changes position at each end of the antenna travel thereby changing the pulse code of the transmitted signal. Other circuits employing a single tapped delay line, delay lines in series or other entirely different circuits for impressing a pulse code on the transmitted signal may be substituted for the circuit of Fig. 5 without departing from the spirit and scope of the present invention.

Figure 3:
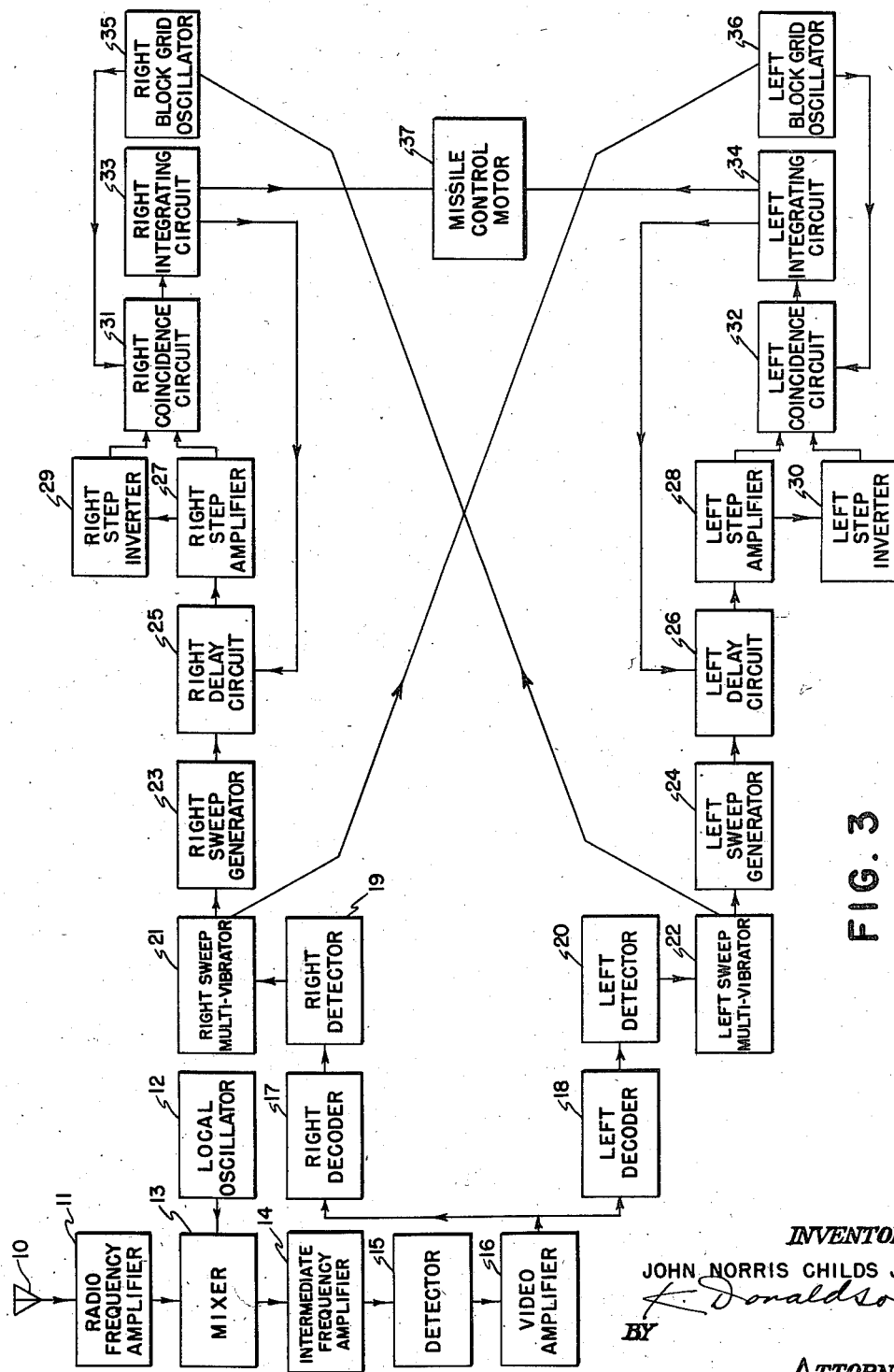
Fig. 3 is a block diagram of one embodiment of the part of the control apparatus which is installed in the guided missile.

Fig. 3 discloses in block diagram form one embodiment of the receiver and control equipment located in the missile itself. The receiver is a conventional superheterodyne radar receiver comprising directional receiving antenna 10, radio frequency amplifier 11, local oscillator 12, mixer 13, intermediate frequency amplifier 14, detector 15, and video amplifier 16.

The video output of the receiver is shown in Fig. 2C for the example used herein. In this example, since the sweeping beam 111 of Fig. 1 makes five full cycles per second, the average sweep speed is eleven degrees times five cycles per second times two sweeps per cycle or 110 degrees per second. Since the sweep is sinusoidal about the center line 113 of the swept sector 112 the maximum speed is $\pi/2$ times 110 degrees per second or 172 degrees per second and occurs as the beam 111 crosses the center line 113. Assuming the distant target 116 has negligible width, and knowing that the pulse repetition frequency is 1500 cycles per second and the beam width $\phi$ is one degree, the minimum number of sets of pulses received by the receiver in the missile each time the beam is swept past is 1500/172, or nine. Therefore the output of the video amplifier 16 will consist of a group of nine sets of pulses for each sweep. The spacing between adjacent groups of pulses will depend upon whether the missile 114 is to the right or left of the center line 113 of the swept sector 112. The spacing between alternate groups of pulses will always be ⅕ second or 200,000 microseconds.

The video output of the receiver is applied to both the right decoder circuit 17 and the left decoder circuit 18. Each of these decoders may be any circuit that will pass a signal composed of a certain set of pulses and reject all other pulses. One form of pulse decoder circuit that may be employed as the right decoder 17 in the present invention is illustrated in Fig. 6. Video amplifier 16 in Fig. 6 corresponds to the similarly numbered block in Fig. 3. The signal from video amplifier 16 is applied directly to a first control grid of a coincidence tube 250 and to the inputs of two signal delay circuits 252 and 254. Signal delay circuits 252 and 254 may include a liquid or solid delay line, an artificial transmission line or any one of a number of electronic delay circuits. The output of delay line 252 is coupled directly to a second control grid of coincidence tube 250. A signal mixer circuit in the form of serially connected resistors 256 and 258 is also coupled to the first mentioned control grid. One end of resistor 258 is returned to a suitable source of negative bias potential to assure that coincidence tube 250 is normally maintained in a non-conducting state. The output of delay circuit 254 is coupled to the junction of resistors 256 and 258 so that the signal at the first control grid of coincidence tube 250 is the sum of the direct output of video amplifier 16 and the output of delay circuit 254. Coincidence tube 250 is so biased that it will conduct only on the simultaneous occurrence of a positive pulse signal in the outputs of video amplifier 16 and signal delay circuits 252 and 254. Possible modifications of the circuit shown in Fig. 6 include a coincidence tube having a single grid where the three input signals are applied to a resistor mixer or isolating circuit coupled to the single control grid or a coincidence tube having three control grids with each of the three inputs being applied to a separate control grid. Again, delay circuits 252 and 254 may take the form of a single tapped delay line or of two delay lines connected in series.

The left decoder circuit 18 may take any of the forms suggested above and will differ from the right decoder circuit 17 only in the delay time of delay circuit 254. In this example, the delay circuit in the left decoder 18 corresponding to delay circuit 254 would have a time delay of only three microseconds.

Right detector 19 and left detector 20 detect the envelopes of the group of pulses passed by the associated decoder circuits and produce relatively wide pulses representing the envelope of at least nine sets of pulses contained in a group. The output pulses from right detector 19 and left detector 20 are shown as waveforms A and B respectively of Fig. 4. The pulses from the detectors occur at the time during the associated sweep at which the sweeping beam points at the missile. The pulses from right detector 19 and left detector 20 trigger right sweep multivibrator 21 and left sweep multivibrator 22 which, in turn, provide enabling voltages for right sweep generator 23 and left sweep generator 24 respectively. Multivibrators 21 and 22 are of the one-stable-state type and provide output waveforms as shown in waveforms C and E respectively of Fig. 4. Thus sweep voltages of sawtooth waveform as shown in waveforms D and F of Fig. 4 are initiated in the right and left channels, respectively, at the instant the sweeping beam strikes the missile on the right and left sweeps respectively.

In general, the method of control is to compare the voltage to which the sweep voltage waveforms have risen by the time the following signal appears in the opposite channel. The sweep voltage waveform which has risen to the highest value and the difference between the values to which the two have risen provide information about the direction and magnitude of the deviation of the missile from the center line of the swept sector. This information is then used to correct the course of the missile. In particular, the embodiment shown in block form in Fig. 3 shows sweep generators 23 and 24 feeding delay circuits 25 and 26.

Figure 4:
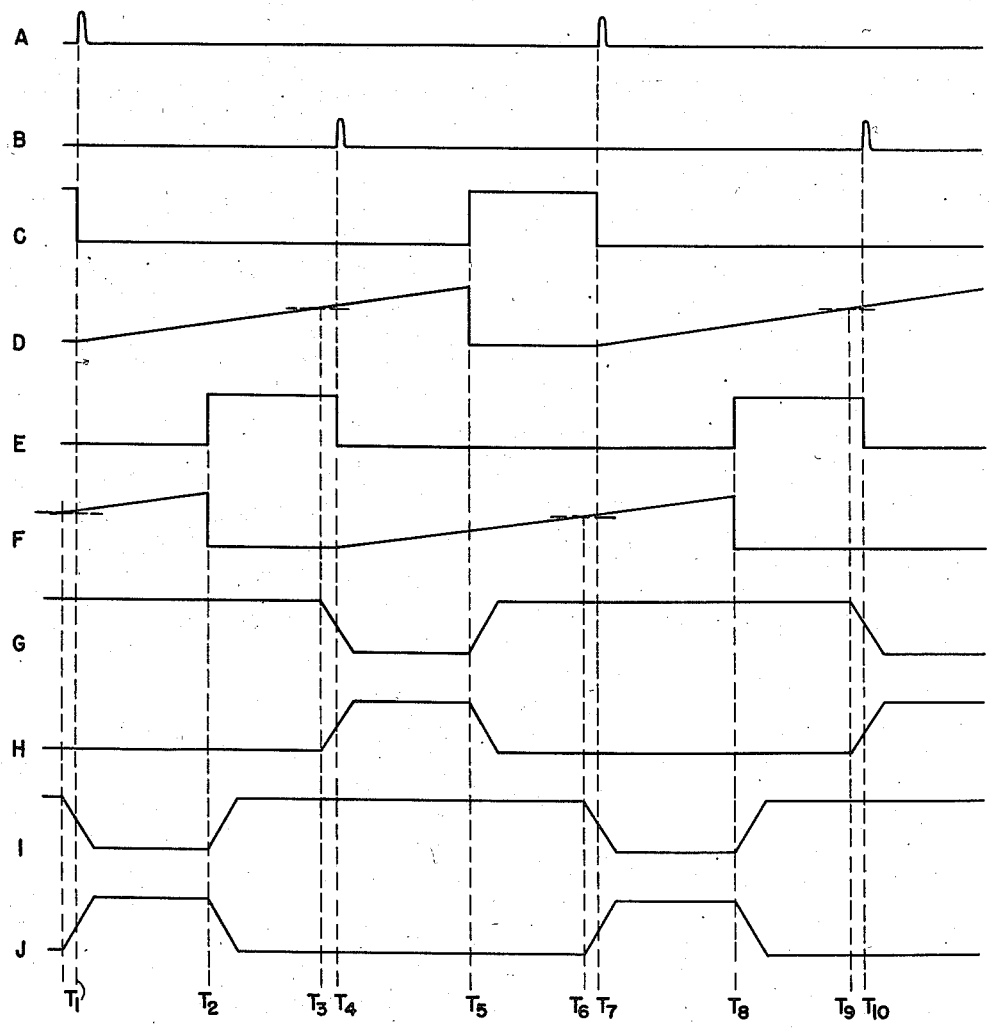
Fig. 4 is a group of waveforms of voltages found at various points in the embodiment of Fig. 3.

Delay circuits 25 and 26 provide delayed step voltages which are amplified and inverted by step amplifiers 27 and 28 and step inverters 29 and 30 to produce the waveforms G, I, H and J respectively of Fig. 4. The outputs of right step amplifier 27 and right step inverter 29 are coupled to right coincidence circuit 31 which also receivers a signal from right blocking grid oscillator 35. Similarly left step amplifier 28, left step inverter 30 and left blocking grid oscillator 36 all couple a signal to left coincidence circuit 32. The output of coincidence circuits 31 and 32 are coupled to right integrating circuit 33 and left integrating circuit 34 respectively. Each of the integrating circuits 33 and 34 includes a condenser that is charged and discharged by the output of the associated coincidence circuit. The potential across this condenser is coupled back to the delay circuit in the same channel to control the operation thereof.

Figure 7:
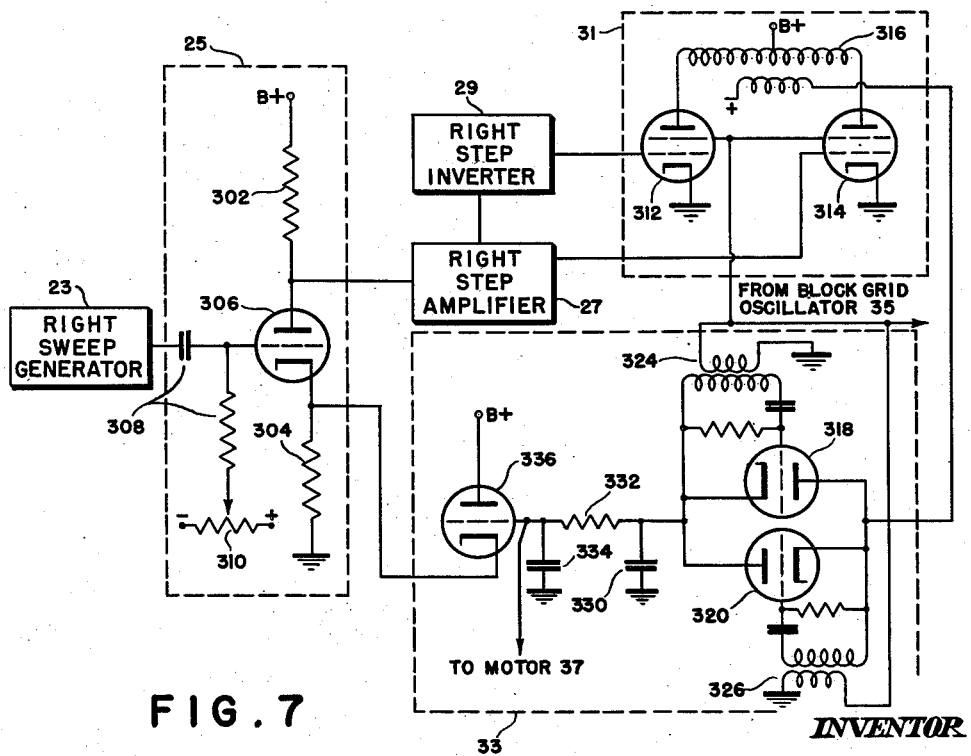
Fig. 7 is a schematic diagram of a portion of the right channel of the embodiment of Fig. 3.

Fig. 7 illustrates in more detail the circuitry of the right channel from right sweep generator 23 to right integrator 33. Since the left channel from left sweep generator 24 to left integrating circuit 34 is identical to the right channel, only the right channel will be described in detail. As shown in Fig. 7, right delay circuit 25 comprises a triode amplifier stage having a load resister 302 in the anode circuit and a second resistor 304 connected in the cathode circuit of electron tube 306.

The sawtooth signal from right sweep generator 23 is applied to the control grid of tube 306 through a coupling network 308. The control grid of tube 306 is provided with an adjustable bias potential from source 310. The bias potential on the control grid of tube 306 is adjusted only during the initial adjustment of the circuit and thereafter the grid to cathode bias of tube 306 is varied by varying the cathode potential by means of a signal coupled thereto from right integrating circuit 33.

The delayed step voltage illustrated as waveform G of Fig. 4 is generated at the anode of tube 306 when the potential of the control grid rises from some point below cutoff to a potential that will permit anode current conduction in tube 306. The leading edge of the step waveform will be sloping due to the fact that the control grid is still rising in potential as the step waveform is being generated.

The delayed step voltage provided by right delay circuit 25 is amplified and inverted by right step amplifier 27 and right step inverter 29. Since the right step amplifier 27 may be a conventional two-stage voltage amplifier and the right step inverter 29 may be a conventional unity gain voltage amplifier which inverts but does not change the amplitude of the signals applied thereto, these circuits have not been illustrated in detail in Fig. 7.

As shown in Fig. 7, the signals from the right step amplifier 27 and right step inverter 29 are connected to the control grids of electron tubes 314 and 312, respectively, which are included in right coincidence circuit 31.

Referring for a moment to Fig. 3, right blocking grid oscillator 35 receives a signal from left sweep multivibrator 22 and produces a short pulse output at a time corresponding to the leading edge of the signal generated by multivibrator 22. This signal generated by right blocking grid oscillator 35 is coupled to right coincidence circuit 31. As shown in Fig. 7, this signal from right blocking grid oscillator 35 is coupled to a second grid of tubes 312 and 314. Tubes 312 and 314 are so biased that they will conduct only when this pulse signal is coupled to the second grid. The amount of plate current conduction through tubes 312 and 314 during such pulses will depend on the potentials on the control grids of these tubes at the time the pulse occurs.

The anodes of tubes 312 and 314 are connected to the end terminals of the primary of differential pulse transformer 316. The center tap of the primary winding is returned to a source of anode potential. One terminal of the secondary winding of transformer 316 is connected to a source of positive bias potential represented in Fig. 7 by a plus sign. The function of this positive bias will appear presently. The signal appearing in the secondary of transformer 316 will be the difference of the signals appearing in the two halves of the primary winding. Thus, the signal in the secondary winding will be pulses of either positive or negative polarity and of variable amplitude depending upon the relative conduction of tubes 312 and 314. If the amplitude of the step voltage is exactly equal to the amplitude of the inverted step voltage at the instant the pulse is coupled to the second grids, no signal will appear in the secondary of transformer 316. These pulse signals with the superimposed positive bias are coupled to the right integrating circuit of Fig. 3. In the right integrator circuit 33 shown in Fig. 7, triode vacuum tubes 318 and 320 form a gated detector circuit of the type disclosed in Patent No. 2,389,692 to C. W. Sherwin. In this circuit tubes 318 and 320 are normally cut off by the bias developed across the associated resistor-capacitor grid biasing circuit. The pulse signal from blocking grid oscillator 35 that is coupled to the second grid of tubes 312 and 314 of right coincidence circuit 33 is also coupled to pulse transformers 324 and 326 which are connected in the grid circuits of tubes 318 and 320 respectively. The pulse signals in the secondaries of transformers 324 and 326 bring the grids of tubes 318 and 320 to cathode potential at the time that a pulse occurs across the secondary of transformer 316. With the grids of tubes 318 and 320 at cathode potential, capacitor 330 will charge to potential equal to the algebraic sum of the signal across the secondary of the transformer 316 and the positive bias connected thereto. At the termination of the pulse from blocking grid oscillator 35 capacitor 330 is prevented from discharging due to the fact that tubes 318 and 320 are then biased beyond cutoff. Resistor 332 and capacitor 334, which are connected across capacitor 330, act as a filter to smooth out any sudden changes in potential across capacitor 330. The ungrounded terminal of capacitor 334 is connected to the grid of triode tube 336. Tube 336 is connected in a cathode follower circuit in which the load resistor is the cathode load resistor 304 of tube 306 in the right delay circuit 25. In the absence of a signal on the grid of tube 306, the potential of the grid of tube 336 will determine the potential on cathode of tube 306. Since the potential on the cathode of tube 306 determines the time at which the sawtooth voltage from right sawtooth generator 23 will cause tube 306 to conduct and generate the right step voltage, the circuit from right delay circuit 23 to right integrating circuit 33 forms a closed loop pulse tracking circuit.

The grid to cathode bias of tube 306 with no signal appearing across the secondary of transformer 316 is such that the delay introduced in right delay circuit 25 will cause the right step voltage and the right inverted step voltage to have equal amplitudes at the time a pulse signal is generated by right blocking grid oscillator 35 if the missile is on the center line of the swept sector. If the missile moves off this center line, the pulse from oscillator 35 will no longer occur at the time of equal amplitude of the step voltage and the inverted step voltage. The signal developed across the secondary of transformer 316 and coupled to capacitor 330 through tubes 318 and 320 will be in a direction to adjust the delay to restore the original condition of equality between the step voltage and the inverted step voltage at the time a pulse is generated by oscillator 35. This equality cannot be completely achieved when the missile is off the centerline of the swept sector since a very small error is needed to maintain the error voltage across capacitor 330. This error voltage across capacitor 330 or the filtered voltage across capacitor 334 in addition to adjusting the delay of delay circuit 25 also provides a measure of the deviation of the missile from the center line of the swept sector.

The potentials across capacitor 334 in right integrating circuit 33 and the corresponding capacitor in left integrating circuit 34 are coupled to missile control motor 37. This connection is preferably made to opposite ends of the field of motor 37 so that motor 37 operates only when there is a difference in signal from right integrating circuit 33 and left integrating circuit 34, the direction of rotation of motor 37 depending upon the direction of the difference in signals.

Summarizing the manner of operation of the circuit of Fig. 3 the right channel is synchronized by signals occurring in the output of the right detector and measures by means of the circuit shown in Fig. 7 the time interval to the next occurring signal in the output of the left detector 20. Similarly the left channel is synchronized by signals from the left detector 20 and measures the time interval to the next occurring signal in the output of right detector 19. Any difference in these time intervals will appear as a difference signal applied to missile control motor 37.

The waveforms of Fig. 4 are shown related to one another as they would be if missile 114 were on course along center line 113 of the swept sector 112.

As stated above, waveforms A and B represent the outputs of right detectors 19 and 20 respectively and waveforms C and E represent the output waveforms of right sweep multivibrator 21 and left sweep multivibrator 22 respectively. One cycle of right sweep multivibrator 21 occurs on waveform C between $t_1$ and $t_7$ while one cycle of left sweep multivibrator 22 occurs on waveform E between $t_4$ and $t_{10}$. The outputs of sweep multivibrators 21 and 22 provide enabling voltages for sweep generators 23 and 24 which produce sawtooth waveforms D and F respectively. When sawtooth waveforms D and F are applied to control grids of delay circuits 25 and 26, the control grids will rise sufficiently with respect to the cathode to cause conduction at times $t_3$ and $t_6$ and the step voltage of waveforms G and I will be formed. Waveforms H and J represent waveforms G and I inverted by step inverters 29 and 30 respectively. The leading edges of all step voltage waveforms are purposely made sloping.

It will be observed that if waveforms G and H are applied to corresponding control grids of the two tubes of right coincidence circuit 31, these grids will be at the same potential at time $t_4$ when the pulse of waveform B appears in the left channel. This pulse of waveform B causes waveform E from left sweep multivibrator 22 and the leading edge of waveform E triggers right blocking grid oscillator 35 producing a peaked output therefrom at precisely time $t_4$. This peaked output is applied in parallel to second control grids of the two tubes of right coincidence circuit 31. Therefore since the corresponding control grids of the two tubes of right coincidence circuit 31 are at the same potential, the tubes conduct equally and the charge on the condenser of right integrating circuit 33 is unchanged. A similar analysis can be applied to the left channel. Thus the inputs to the missile control motor 37 are balanced against one another and the course of the missile is unchanged.

However, if the missile had been off course so that the pulse of waveform B occurred slightly later, the two control grids to which waveforms G and H were applied would no longer have been at the same potential. Therefore one of the two tubes of right coincidence circuit 31 would have conducted more heavily than the other with the result that the change on the condenser of right integrating circuit 33 would have changed to cause a rise in the D. C. output level. This rise would be fed back to the cathode of right delay circuit 25 to increase the cut off voltage of the tube therein and thereby tend to restore the relationships of Fig. 4. Similar reasoning will show that at the same time the output level of left integrating circuit 34 will drop. By properly applying the outputs of the two integrating circuits 33 and 34 to opposite ends of the field of the missile control motor 37 the motor adjusts the control surfaces of the missile to place it back on course.

It should be pointed out that this is only one of a number of pulse tracking circuits familiar to those skilled in the art which could be applied to actuate the missile control motor in conjunction with apparatus of the type described.

It should further be pointed out that apparatus of the type described could be used to guide a missile from an aircraft to ground or from an aircraft to another aircraft by providing two beams sweeping through sectors in planes perpendicular to one another, the center lines of the sectors being coincident and pointed at the target.

It will be appreciated that the apparatus described permits lightweight construction and convenient installation in a guided missile. Since the antenna on the missile can be very directional and pointed directly away from the target, the apparatus is invulnerable to enemy jamming from the target. An indefinite number of missiles can be controlled by one mother station at the same time. The mother transmitter could be devised by very simple modification to existing fire control radar sets as could the receiver components for the guided missile itself.

Thus since various modifications and extensions of the present disclosure will be apparent to those skilled in the art, this invention is to be limited only by the appended claims.

The invention described herein may be manufactured and used by or for the Government of the United States of America for governmental purposes without the payment of any royalties thereon or therefor.

I claim:

1. Radio apparatus for guiding an object toward a distant target, said apparatus comprising means for periodically oscillating a directional beam of electromagnetic energy through a predetermined sector including said distant target, said beam having a first characteristic when sweeping in a first direction and a second characteristic while sweeping in the opposite direction, receiving means on said object for receiving signals each time said beam sweeps past said object, discriminating means associated with said receiving means for separating signals having said first characteristic from signals having said second characteristic, circuit means coupled to said discriminating means for comparing the time interval between the arrival of signals of said first characteristic and signals of said second characteristic to the time interval between the arrival of said signals of said second characteristic with the following arrival of signals of said first characteristic and control means coupled to said circuit means and responsive thereto for guiding said object in a direction to establish a predetermined relationship between the lengths of said respective time intervals.

2. Radio apparatus for guiding a missile toward a distant target comprising in combination a pulse transmitter, a directional antenna coupled to said pulse transmitter, means for sweeping the beam of energy radiated from said antenna through a sector centered about said target, means for causing the energy transmitted from said antenna to have a first characteristic when said beam moves in a first direction through said sector and to have a second characteristic when said beam moves in the opposite direction through said sector, means for introducing said missile into the swept sector, means located in said missile for receiving signals from said transmitter each time said beam impinges upon said missile, means coupled to said receiving means for separating signals having said first characteristic from signals having said second characteristic, means for comparing the time interval between the time signals of said first characteristic are received and the time signals of said second characteristic are received with the time interval between the time signals of said second characteristic are received and the time signals of said first characteristic are received and means coupled to said comparing circuit means for guiding said missile in a direction tending to equalize said two time intervals.

3. Radio apparatus for guiding an object toward a distant target comprising, in combination, a pulse transmitter, a directional antenna coupled to said pulse transmitter, means for cylically sweeping the beam of energy radiated from said antenna through a sector centered about said target, means for impressing a first pulse code on said energy when said beam is sweeping in a first direction through said sector, means for impressing a second pulse code on said energy when said beam is sweeping in the opposite direction through said sector, means for launching said object to be guided into said swept sector, a receiver located on the object for receiving signals from said transmitter each time said beam sweeps said object, decoding means for directing signals having said first code into a first signal channel and signals having a second code into a second signal channel, circuit means for comparing the time interval between the time a signal appears in said first channel and the time a signal appears in said second channel with the time interval between the time a signal appears in said second channel and the time a signal appears in said first channel and control means responsive to said comparison circuit means for guiding said object in a direction determined by the relative lengths of said two time inervals.

4. Apparatus as in claim 3 wherein said comparing circuit means comprise means coupled to said decoding means in said first channel for generating a rising potential that has an initial time of rise a predetermined time after a signal is received in said first channel, means coupled to said decoding means in said first channel for generating a falling potential having an initial time of fall coincident with said initial time of rise, and means coupled to said two generating means and to said decoder in said second signal channel for generating a first difference signal equal to the difference in amplitude of said rising and falling potentials at the time a signal is received in said second channel, means coupled to said decoding means in said second channel for generating a second rising potential that has an initial time of rise a predetermined time after a signal is received in said second channel, means coupled to said decoding means in said second channel for generating a second falling potential that has an initial time of fall coincident with said last mentioned initial time of rise, means coupled to said two last mentioned generating means and to said decoding means in said first signal channel for generating a second difference signal equal to the difference in amplitude of said second rising and falling potentials at a time a signal is received in said first channel and wherein said control means comprises a servo-mechanism responsive to said first and second difference signals.

5. Radio apparatus for guiding an object along the midposition of a beam of energy oscillating at a uniform rate about said midposition, said beam of energy having a first characteristic while sweeping in a first direction and a second characteristic while sweeping in the opposite direction, said apparatus comprising receiving means on said object for receiving energy each time said beam sweeps past said object, circuit means coupled to said receiving means providing signals indicative of the duration of the time intervals between successive receptions of said energy, and control means coupled to said circuit means and responsive to the difference in signals representing successive time intervals for guiding said object in a direction to equalize the time intervals between successive receptions of said energy.

6. Radio apparatus for guiding an object along the midposition of a beam of energy oscillating at a uniform rate about said midposition, said beam of energy having a first characteristic while sweeping in a first direction and a second characteristic while sweeping in the opposite direction, said apparatus comprising receiving means on said object for receiving energy each time said beam sweeps past said object, circuit means coupled to said receiving means providing a signal indicative of the magnitude and direction of the difference between a time interval equal to one-half the time for one complete oscillation of said beam and the time interval between the time energy of said first characteristic is received and the time that energy of said second characteristic is received, and control means coupled to said last-mentioned circuit means and responsive to said provided signal for guiding said object in a direction to reduce the difference between said two time intervals.

7. Radio apparatus for guiding an object along the mid-position of a beam of energy oscillating at a uniform rate about said midposition and having a first characteristic while sweeping in one direction and a second characteristic while sweeping in the opposite direction, said apparatus comprising, receiving means on said object for receiving energy of said first characteristic as said beam of energy sweeps past said object in said first direction, receiving means on said object for receiving energy of said second characteristic as said beam of energy sweeps past said object in said opposite direction, circuit means on said object coupled to said two receiving means for measuring the time interval between the time at which energy of said first characteristic is received and the time at which energy of said second characteristic is received, additional circuit means coupled to said two receiving means for measuring the time interval between the time at which energy of said second characteristic is received and the time at which energy of said first characteristic is received, and control means coupled to said two interval-measuring circuit means, said control means being adapted to direct said object in a direction to equalize said two time intervals.

8. Radio apparatus for guiding an object along the midposition of a directive beam of energy oscillating at a uniform rate about a midposition, said beam of energy having a first characteristic while sweeping in one direction and a second characteristic while sweeping in the opposite direction, said apparatus comprising receiving means on said object for receiving energy each time said beam sweeps past said object, first signal generating means coupled to said receiver and providing a signal indicative of the time interval between the time at which energy of said first characteristic is received and the time at which energy of said second characteristic is received, second signal generating means coupled to said receiver and providing a signal indicative of the time interval between the time at which energy of said second characteristic is received and the time at which energy of said first characteristic is received, and control means coupled to said two signal generating means and responsive to said two provided signals for directing said object in a direction tending to equalize said two time intervals.

9. Radio apparatus for guiding an object along the midposition of a directive beam of energy oscillating at a uniform rate about said midposition said beam of energy having a first characteristic while sweeping in one direction and a second characteristic while sweeping in the opposite direction, said apparatus comprising receiving means on said object for receiving energy each time said beam sweeps past said object, first and second similar interval measuring channels coupled to said receiver, each of said channels comprising signal separating means for passing signals derived from energy having one of said two characteristics and excluding signals derived from energy having the other of said characteristics, means coupled to said signal separating means and providing at least one signal having a characteristic during a preselected time interval indicative of the elapsed time since the reception of energy of the characteristic passed by said channel, and coincidence means coupled to said last-mentioned means and to said other channel, said coincidence means providing a signal indicative of the interval between the time at which energy of the characteristic passed by said channel is received and the time at which energy passed by the other said channel is received, and control means responsive to the signals from said coincidence means in said first and second channels, said control means guiding said object in a direction to equalize the intervals measured by said two measuring channels.

10. Radio apparatus for guiding an object along the midposition of a directive, pulse modulated beam of electromagnetic energy oscillating at a uniform rate about said midposition, said beam of energy being modulated by a first pulse code group when sweeping in one direction and a second pulse code group when sweeping in the opposite direction, said apparatus comprising means on said object providing a first signal pulse in response to energy received as said beam sweeps past said object in one direction and a second signal pulse in response to energy received as said beam sweeps past said object in the opposite direction, circuit means providing a signal indicative of the time interval between the time of occurrence of said first signal pulse and the time of occurrence of said second signal pulse, additional circuit means providing a signal indicative of the time interval between the time of occurrence of said second signal pulse and the following first signal pulse and control means coupled to said two last-mentioned circuit means and responsive to said provided signals, said control means guiding said object in a direction to equalize said two time intervals.

11. A radio control system for guiding an object to a remote target comprising in combination, a pulse transmitter for producing a beam of concentrated energy, means for cyclically sweeping said beam back and forth through a predetermined sector, the symmetrical axis of which is coincidental with the line of sight from the transmitter to the remote target, said beam having a first characteristic when moving in a first direction and a second characteristic when moving in the opposite direction, means for launching said object to be guided so that it enters the swept sector, receiving means disposed within said object for producing a first group of signals each time said object is swept while the beam has its first characteristic and a second group of signals each time said object is swept while the beam has its second characteristic, circuit means associated with said receiving means for comparing the time interval between the occurrence of successive first and second groups of signals with the time interval between the occurrence of said second group of signals and the immediately succeeding first group of signals and means responsive to said comparing circuit for directing said object in a direction such that the respective time intervals will be equalized.

12. A radio control system for guiding an object to a remote target comprising in combination, a pulse transmitter for producing a highly directional beam of concentrated energy, means for periodically and cyclically sweeping said beam back and forth through a predetermined sector, the symmetrical axis of which is coincidental with the line of sight from the transmitter to the remote target, means associated with said transmitter for varying the character of the beam from a first to a second condition whenever the direction of the beam is reversed, means for launching said object to be guided into the swept sector, receiving means disposed within said object, first and second timing circuits forming part of said receiving means, means associated with said receiving means for producing first signal groups whenever said object is swept by the directional beam while the beam is in its first condition and second signal groups whenever said object is swept by the directional beam while the beam is in its second condition, means controlled by the occurrence of said first signal group for initiating the operation of said first timing circuit and means responsive to the occurrence of the next second signal group for controlling said first timing circuit whereby a first control signal indicative of the time interval between the respective signal groups is produced, means controlled by the occurrence of said second signal group for initiating the operation of said second timing circuit and means responsive to the following first signal group for controlling said second timing circuit whereby a second control signal indicative of the time interval between the second signal group and the succeeding first signal group is produced, means for comparing said first and second control signals and means responsive to their difference for guiding said object in a direction such that the individual control signals will be equalized.

13. A radio control system for guiding an object to a remote target comprising in combination, a transmitter for producing a directional beam of concentrated energy, means for sweeping said beam at a uniform rate repeatedly back and forth through a spatial sector centered with respect to said target, means for launching said object to be guided within the swept sector, receiving means disposed within said object for producing a control signal each time the directional beam impinges upon the object, said receiving means including means for comparing the time interval between the production of a first control signal and the following second control signal with the time interval between the production of said second control signal and the following third control signal and means responsive to said comparing means for guiding said object in a direction such that the respective time intervals are equalized.

14. Radio apparatus for guiding an object towards a distant target, said apparatus comprising means for sweeping a directional beam of electromagnetic energy periodically back and forth through a sector centered about said target to define a complete scanning cycle, means for introducing said object to be guided into said swept sector whereby said beam will impinge thereupon during each half of the scanning cycle, receiving means disposed within said object for producing a signal each time said directional beam impinges thereon, circuit means coupled to said receiving means for comparing the time interval between the production of a first and a second successive signal and the time interval between the production of said second and a third successive signal, and means responsive to said comparing circuit for directing said object in a direction to establish a predetermined relationship between the lengths of said two-time intervals.

15. Radio apparatus for guiding an object towards a distant target, said apparatus comprising in combination a radio transmitter, a directional antenna coupled to said radio transmitter, means for sweeping the beam of energy radiated from said antenna back and forth through a spatial sector centered about said target, means for launching said object to be guided into said swept spatial sector, receiver means in said object adapted to produce a signal whenever said beam impinges thereupon, circuit means coupled to said receiving means for comparing the time interval between the times a first and second successive signal is produced and the time interval between the times said second and a third successive signal is produced, and means responsive to said comparing circuit means for directing said object in accordance with the relative lengths of the two-time intervals above defined.

References Cited in the file of this patent
UNITED STATES PATENTS

| | | |
|---|---|---|
| 1,437,400 | Conners | Dec. 5, 1922 |
| 2,112,283 | Fritz | Mar. 29, 1933 |
| 2,404,942 | Bedford | July 30, 1946 |
| 2,424,193 | Rost et al. | July 15, 1947 |
| 2,448,007 | Ayres | Aug. 31, 1948 |
| 2,557,401 | Agins et al. | June 19, 1951 |
| 2,579,823 | Homrighous | Dec. 25, 1951 |